United States Patent
Anderson

(10) Patent No.: US 6,189,258 B1
(45) Date of Patent: Feb. 20, 2001

(54) FISHING LINE CONTAINER

(76) Inventor: Carl Anderson, 1011 Capouse Ave., Scranton, PA (US) 18501

( * ) Notice: Under 35 U.S.C. 154(b), the term of this patent shall be extended for 0 days.

(21) Appl. No.: 09/044,657

(22) Filed: Mar. 19, 1998

(51) Int. Cl.$^7$ ............................ A01K 97/06; A01K 97/08
(52) U.S. Cl. .............................. 43/54.1; 43/4; 206/315.11
(58) Field of Search ............. 43/1, 4, 54.1; 206/315.11, 206/388; 220/601, 642, 605, 606, 608, 603, 611; 242/407, 398; 47/21, 23, 24, 26, 30, 71

(56) References Cited

U.S. PATENT DOCUMENTS

| | | | |
|---|---|---|---|
| D. 21,620 | * 6/1892 | Bennett et al. | 220/606 |
| D. 361,201 | * 8/1995 | Chaney et al. | 206/315.11 |
| 405,433 | 6/1889 | Rusbatch | 242/361.4 |
| 651,884 | * 6/1900 | Platz | 220/606 |
| 664,896 | 1/1901 | Robertson | 242/360 |
| 833,288 | * 10/1906 | Anderson | 220/611 |
| 2,300,243 | * 10/1942 | Zierden | 242/398 |
| 2,509,275 | * 5/1950 | Poncy | 220/606 |
| 3,179,351 | * 4/1965 | Ehlert | 43/54.1 |
| 3,199,807 | 8/1965 | Kirsch et al. | 242/395 |
| 3,378,134 | * 4/1968 | Wilkinson et al. | 43/54.1 |
| 3,471,114 | * 10/1969 | Ball | 220/605 |
| 3,603,019 | * 9/1971 | Smeltzer | 43/54.1 |
| 3,653,144 | * 4/1972 | Rocka | 43/54.1 |
| 3,659,369 | * 5/1972 | Hermanson | 43/54.1 |
| 3,798,826 | * 3/1974 | Ferguson | 43/54.1 |
| 4,297,802 | 11/1981 | Normann | 43/4 |
| 4,388,996 | * 6/1983 | Panicci | 220/603 |
| 4,402,471 | 9/1983 | Normann | 242/96 |
| 4,436,700 | * 3/1984 | Erickson | 220/606 |
| 4,505,386 | * 3/1985 | Abrahamson | 206/315.11 |
| 4,573,604 | * 3/1986 | Guim | 220/605 |
| 4,616,758 | * 10/1986 | Zimmerman | 220/605 |
| 4,759,148 | * 7/1988 | Love | 43/54.1 |
| 4,767,015 | * 8/1988 | Ho | 220/69 |
| 4,845,881 | * 7/1989 | Ward | 43/54.1 |
| 4,905,945 | * 3/1990 | Peteron | 248/146 |
| 4,919,284 | * 4/1990 | Tiedemann et al. | 220/605 |
| 4,984,685 | 1/1991 | Douglas | 206/334 |
| 5,046,636 | * 9/1991 | Coskery | 220/601 |
| 5,058,757 | * 10/1991 | Proa | 220/739 |
| 5,086,914 | 2/1992 | Mish et al. | 206/63.3 |
| 5,103,977 | 4/1992 | Douglas | 206/334 |
| 5,131,179 | * 7/1992 | McEwen | 43/54.1 |
| 5,158,193 | * 10/1992 | Chen | 220/632 |
| 5,182,877 | * 2/1993 | Burchill et al. | 43/54.1 |
| 5,271,520 | * 12/1993 | McAfee | 206/315.11 |
| 5,294,018 | * 3/1994 | Boucher | 220/603 |
| 5,336,892 | * 8/1994 | Zaffina | 43/54.1 |
| 5,351,850 | * 10/1994 | Brieskorn | 220/601 |
| 5,411,014 | * 5/1995 | Paul | 220/608 |
| 5,421,457 | * 6/1995 | Listenberger | 206/388 |
| 5,423,452 | * 6/1995 | Tardif | 220/608 |
| 5,427,246 | * 6/1995 | Hadjikhani | 206/554 |
| 5,439,109 | 8/1995 | McBride | 206/388 |
| 5,542,204 | 8/1996 | Heaney | 43/4 |
| 5,586,655 | 12/1996 | McBride | 206/388 |
| 5,615,798 | * 4/1997 | Luburic et al. | 220/601 |
| 5,628,141 | 5/1997 | Crawford | 43/54.1 |
| 5,659,995 | * 8/1997 | Hoffman | 43/54.1 |
| 5,727,709 | * 3/1998 | Nobile | 220/603 |
| 5,860,559 | * 1/1999 | Wang | 220/737 |

* cited by examiner

Primary Examiner—Darren W. Ark
(74) Attorney, Agent, or Firm—Helfgott & Karas, P.C.

(57) ABSTRACT

A container formed as a clear cylindrical tube having a weighted base is dimensioned to pull stripped line into the tube and stack the line in neat coils using the weight of the line to provide a guiding pull. A removable handle may be provided for carrying the container over land and a tubular extension may be removably mounted on the top of the container for accommodating special fishing conditions such as high winds. The container may be used to transport clothing and other articles as it is carried inside a travel bag.

34 Claims, 5 Drawing Sheets

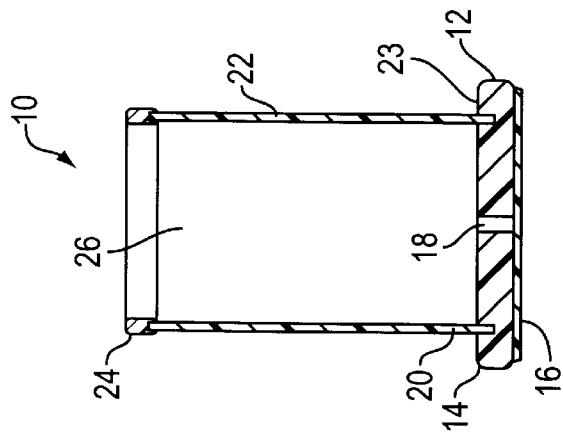
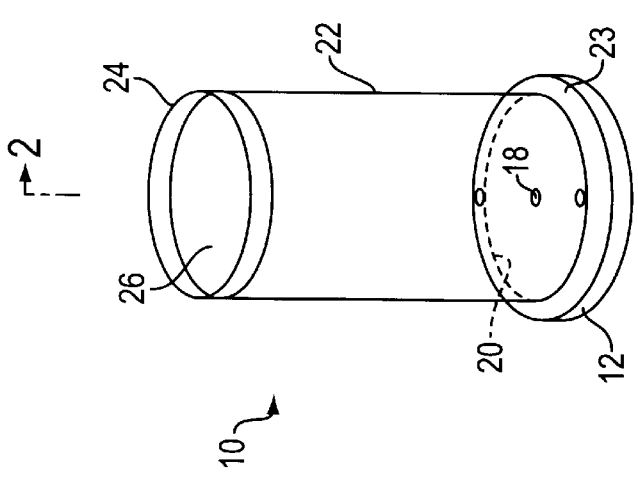
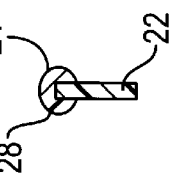
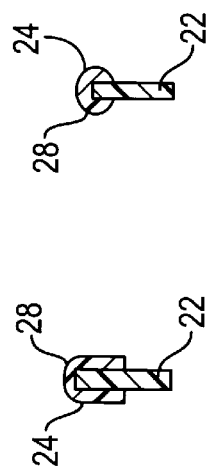

FISHING LINE CONTAINER

BACKGROUND OF THE INVENTION

1. Field of the Invention

The present invention relates in general to containers for temporarily storing fishing rods and in particular to a transparent cylindrical container for managing fly line during and between casts.

2. Description of Prior Developments

When casting fishing line and particularly when casting a fly line, an angler strips line from a reel and typically allows the line to fall to the ground or into the water. Tangled line often results. Conditions are made worse by the presence of a blowing wind which promotes line tangling. Moreover, weeds, grass, rocks, stumps, branches, boat cleats and the like can cause line tangling. Line frequently gets caught under or on an angler's feet.

Line soiling from dirt, dust, or any fine particulate matter can decrease casting distance and accuracy due to the drag on the line caused by increased friction from the dirt. This friction also increases in proportion to the distance the fly line is from the rod when a cast is made. The closer the stripped line is to an angler, the less line drag results thereby allowing a farther cast.

Attempts to relieve such problems include the use of a basket worn around an angler's waist to receive stripped line. While such a basket attempts to improve fly line control, it exhibits certain drawbacks. Because it is designed to be worn on the body of an angler, it becomes an encumbrance. The need to vary line stripping motion is hampered by a relatively cramped tight space within the basket into which the stripped line is directed. This arrangement does not readily receive the stripped line.

Moreover, a varied line stripping motion is often desirable to entice a fish to strike a cast fly. Such variable stripping motion is not conducive to easy placement of the line into a waist-mounted basket. When a long line stripping motion is used, it becomes difficult if not mechanically impossible to properly place a long length of stripped line into the basket. Since a long strip action is often required to set the hook when a fish strikes, the basket may actually distract an angler at this critical point by failing to receive the stripped line.

Although waist mounted baskets work well if an angler is wading in wavy water, the basket does not provide much protection against blowing winds which tend to blow the line all about. Such baskets also cannot provide a resting place for a fly rod or provide storage for the rod and line when moving from place to place.

Fly rods are fragile and are prone to damage when landing a big fish. In this case, if an angler lifts the rod too high and places a high load on the rod tip, the tip can break. Prior line holding arrangements provide no solution to this problem.

Accordingly, a need exists for a method and apparatus which provides a virtually tangle free cast, which protects the line from excessive dirt and wind, which has the potential to clean the line during casting, and which provides a support for a fly rod as an angler lands a fish.

SUMMARY OF INVENTION

The present invention has been developed to fulfill the needs noted above and therefore has as an object the provision of a method and apparatus for use with casting a fishing line and which reduces line tangles, even under windy conditions. A further object of the invention is the provision of a method and apparatus for storing fishing line between casts and for holding and transporting a fishing line and reel with line stripped from the reel.

Still a further object of the invention is the provision of a method and apparatus for ensuring that line stripped from a fishing reel falls into a container and naturally coils itself for subsequent tangle-free casting.

Yet another object of the invention is the provision of a method and apparatus for fly casting which eliminates unnecessary rewinding of stripped line while moving from one fishing location to another, thereby adding to useful fishing time. By storing the rod and stripped line in a container constructed according to the invention, an angler can gain extra minutes of fishing time at each new fishing spot since the line does not have to be rewound and then unstripped between each move. Stripping baskets do not provide this advantage.

Another object of the invention is the provision of a fly rod and fly line container which includes a detachable carrying handle for facilitating transport, placement and use of the container.

Another object of the invention is the provision of a storage container for supporting and storing a fly rod while an angler lands a fish. In this case an angler can use two hands on the line and thereby take the high load off of the rod tip.

Another object of the invention is the provision of a rod, reel and line container which has a rim formed of a low friction material such as nylon or PTFE and which can be coated with a line cleaner, such as the type sold under the name "Glide", to clean the line during casts.

Still another object of the invention is the provision of a fly line container with a weighted bottom covered with a non skid material to securely support a rod, particularly on the deck of a rocking boat.

Yet another object of the invention is the provision of a container which enables an angler to walk with coils of fly line stripped into the container, thereby allowing the angler to cast upon a moment's notice. With each use, this arrangement can save about two and one half minutes which is the average time needed to properly prepare for a cast from a line initially fully wound on a fly reel.

Another object of the invention is to provide a clear, transparent walled line container which provides a clear view of the line and allows an angler to see whether the line is properly coiled in the container or whether the line is tangled.

These and other objects are met by the present invention which includes a clear, open top, cylindrical tube having a weighted base. The tube height is carefully dimensioned to ensure that line stripped from a reel falls naturally under its own weight into the tube.

The tube width is likewise carefully dimensioned to ensure that line falling into the bottom of the tube naturally coils itself into neat coils. This coiling discourages tangling and promotes long and accurate fly casts.

While conventional line holders are typically limited to use out of water, the present invention may be partially submerged with its base resting on bottom and a portion of its tube projecting above the water level. With the tube partially filled with water, it is anchored in place and still provides a convenient container into which stripped line may be stored. Since water seeks its own level, a secure anchorage is achieved by water entering the container through its drain holes.

An angler may strip short or long lengths of line directly into the tube which is preferably maintained in close proximity to the angler. In this manner dirt, sand, wind and other hindrances are largely avoided. In order to maximize casting distance, an angler may stand as close to the tube as desired.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a perspective view of a first embodiment of a fishing line container constructed in accordance with the invention;

FIG. 2 is a view in section taken through line 2—2 of FIG. 1;

FIG. 3 is a fragmented enlarged sectional view of the top rim of FIGS. 1 and 2;

FIG. 4 is a view similar to FIG. 3 showing an alternate embodiment of the rim of FIG. 3;

In the various figures of the drawings, like reference characters designate like parts.

DETAILED DESCRIPTION OF THE PREERRED EMBODIMENT

Figure 6:
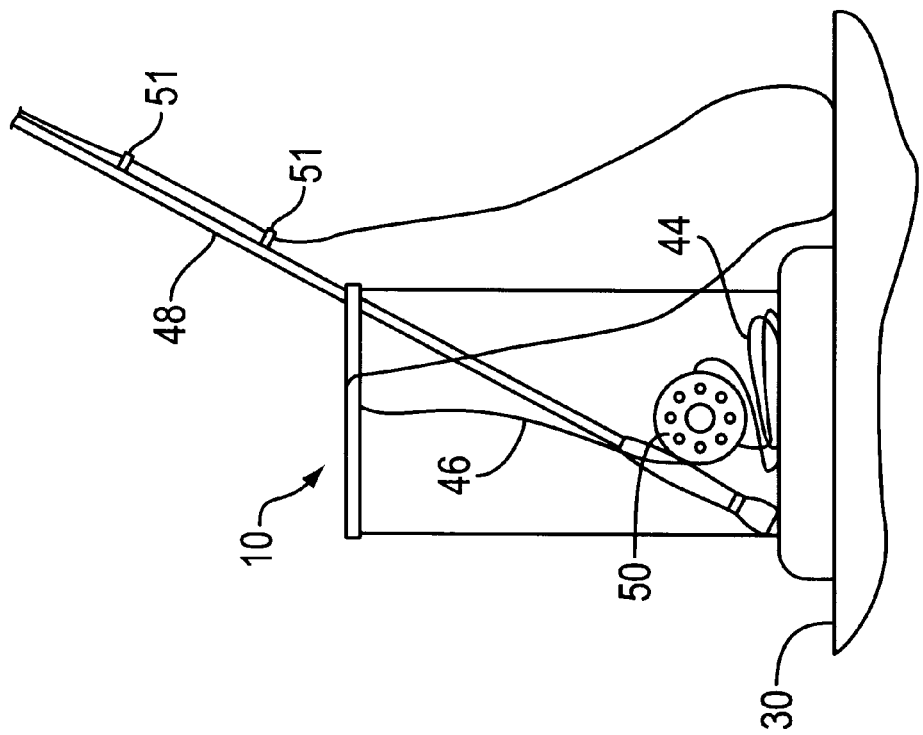
FIG. 6 is a front elevation view of the container of FIG. 1 illustrating a method of storing and transporting a fly fishing rod and reel between casts and/or between fishing locations.

The present invention will now be described in conjunction with the drawings, beginning with FIGS. 1 and 2 which show a container 10 constructed in accordance with a first embodiment of the invention. Container 10 includes a base 12 preferably shaped as a flat circular disk having rounded edges 14.

Base 12 may be formed of any suitable material such as high density polyethylene. Base 12 should have sufficient weight for providing stability to container 10 such that the center of gravity of the container is adjacent the base within about six to twelve inches. This stability is particularly advantageous when the container 10 is mounted on the bow of a rocking boat. A lighter base can be provided if the container is to be carried by an angler along the water's edge. A layer 16 of high friction material such as a low durometer rubber may be applied to the underside of base 12 to prevent the base from sliding on slippery surfaces such as boat decks.

Layer 16 may be secured to the base 12 by adhesive bonding, fasteners or any other suitable technique. Base 12 may be about one inch thick and nominally about 14 inches in diameter. A dual purpose drain and mounting hole 18 may be formed through base 12, and through layer 16 if present. Hole 18 is for the purpose of allowing the base to be fastened to a support or for draining water from the container introduced by wet fishing line when the container is not fastened in position.

A circular groove 20 is formed adjacent the outer edge of base 12 for receiving a cylindrical tube 22 with a snug fit. The base 12 may extend outwardly from tube 22 so as to define an annular flange 23 outside the tube. Tube 22 is preferably formed of a relatively rigid clear plastic such as acrylic or plexiglass and, as seen in FIG. 2, has a wall thickness substantially less than the thickness of the base. Although opaque materials such as aluminum may be used to form tube 22, a clear material is generally preferred to allow a boat operator unobstructed vision when piloting or maneuvering a boat with the container located on its deck. Tube 22 may be permanently fixed to the base 12 with an adhesive.

Although the dimensions of tube 22 may vary, it has been found advantageous to maintain the inner diameter of tube 22 between about 10 and 24 inches, with about 12 inches being preferred. Likewise, the length or height of tube 22 may also vary, but a length of between about 12 and 36 inches is advantageous, with a preferred length of about 24 inches being preferred.

With a tube length of 24 inches, the fingers of an average size angler will be positioned about 2 inches above the top of the container during line stripping. The angler's fingers will hit against the tube if the tube is too high. If the tube is too low, the wind will blow the fly line away from the tube.

Moreover, a short tube will not provide adequate support to a fly rod and can potentially allow the rod to tip over and fall out of the tube. It has been found that a vertical clearance of about 2 to 3 inches between the top of the tube and an angler's fingers is ideal for fly casting. This prevents the angler from hitting the container during casting. The height of the tube 22 can be varied between about 12 and 36 inches to provide the required 2 to 3 inch clearance For anglers of varying heights, to accommodate handicapped anglers as well as to optimize the container for use in boat cockpits having different depths.

An annular rim 24 is mounted over the top edge of tube 24 to provide lubricity around the circular opening 26 at the top of the tube. As seen in FIG. 3, rim 24 may be bonded over the top edge of tube 24 when the rim is formed of a U-shaped strip of low friction plastic material such as nylon or polytetrafluoroethylene(PTFE). Alternatively, as seen in FIG. 4, rim 24 may be formed as a plastic ring having a generally C-shaped cross section and press fit or bonded over the top edge of tube 22.

In either case, rim 24 provides a rounded or radiused edge 28 around the top of the container for allowing fishing line to smoothly flow out of and into the container. This radiused edge reduces friction and wear of the line, as well as increases casting distance. It is possible to form tube 22 from a lighter material such as vinyl so as to make the container easier to carry and to be rolled up and fit into a travel bag. In this case, rim 24 is not strictly necessary since vinyl tubing such as commercially available Pro-Trim vinyl coil is sufficiently supple to stand rigidly upright by itself.

When Pro-Trim vinyl is used, the top edge of the tube provides a relative soft, but sharp edge which does not abrade the line but actually cleans the line. When rim 24 is used, it may be periodically coated with a commercially available fly line cleaner for cleaning the fly line as it slides over rim 24.

As noted above, a preferred inner diameter of tube 22 is about 12 inches. This diameter has been found particularly effective in eliminating tangles and effecting a natural coiling of the line as it is stripped into the container.

In particular, a typical fly reel has a diameter of about four inches. As most fly line is vinyl coated, it has somewhat of a memory. Thus, as the line is stripped from a reel, it tends to uncoil into a larger diameter as it relaxes.

As it turns out, the relaxed uncoiled fly line tends to naturally recoil or stack itself in coils of about 12 inches across. By stripping the fly line into a tube having a diameter of about 12 inches, the fly line naturally stacks or coils itself in the container 10 without requiring any particular effort on the part of the angler.

If the tube diameter is too small, the line is difficult to guide into the container, and if too big, the line tends to tangle. With a 12 inch diameter tube, the line is arranged in a proper "last in, first out" order for smooth, tangle free casts.

It should also be noted that in the event a fish hits the bait or lure at the end of the line, the rapid stripping of the line from container 10 is achieved in a tangle free manner without hanging up on obstacles such as boat cleats and the like. This avoids the loss of hooked fish from broken lines caused by line snagging.

In the unlikely event that a tangle does occur in the container, the clear plastic tubing helps to facilitate untangling. Moreover, if the container 10 is mounted on the foredeck or bow of a boat, the clear, transparent, see-through plastic provides unimpaired vision to the operator of the boat.

As with the selection of a preferred 12 inch diameter tube, the preferred 24 inch height above base 12 is also based on improved casting results. This occurs after an angler strips line into the container 10 and allows it to self-coil in a last-in, first-out spiral. After the initial cast, line is stripped into the container in preparation for a subsequent cast. The line enters the container in a last-in first-out order thereby avoiding tangles.

Because the tube is about 24 inches high and the line is coiled at the bottom of the tube, there is about 24 inches of hanging line weight providing a continuous pull on the line located outside the container. This weight tends to pull the free line into the container and facilitates self winding. Moreover, since a single strip of line pulled by an angler is typically less than 12 inches, the weight of the line suspended within the container is about twice as much as the weight of the free hanging stripped line. This weight relationship promotes and facilitates the stripped line properly and positively entering the container without undue effort on the part of the angler.

Another advantage provided by container 10 is the wind protection provided by tube 22. With line stored in container 10, it cannot be blown around, hung up or blown overboard. Line blown overboard presents a strong drag against casting and can result in a serious problem if it gets tangled and stuck on a propeller or other underwater part of a boat.

Figure 5:
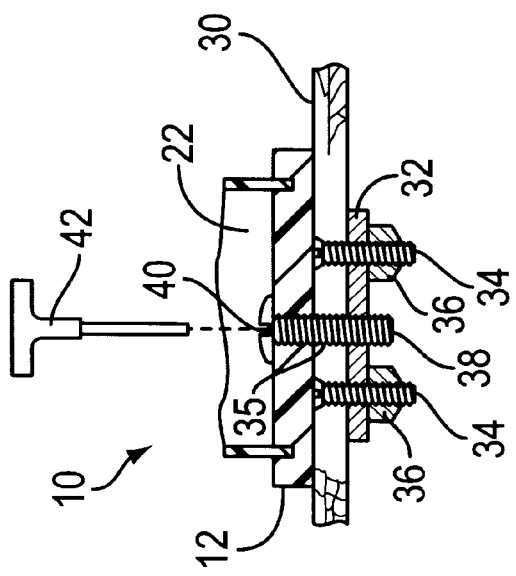
FIG. 5 is a view in section of a mounting assembly for removably mounting the container of FIG. 6 to a mounting surface such as the deck of a boat.

As seen in FIG. 5, the base 12 of container 10 may be removably mounted to a rigid surface 30 such as the foredeck of a fishing boat. A mounting plate 32 formed of a strong rigid material such as aluminum may be permanently mounted to the underside of surface 30 with threaded fasteners 34. Nuts 36 may fix the fasteners 34 to the plate 32.

Mounting plate 32, which may take the form of a disk, includes a central threaded bore 35 which receives a mounting fastener such as bolt 38. Bolt 38 may include an internal recess 40 of the allen type for receiving the shank of a hand tool 42. The container 10 may be quickly and easily mounted to and removed from mounting surface 30 by simply fastening and removing bolt 38.

It should be noted that a simple and practical method of securing the container to a boat is to use hooked elastic cords such as bungee cords. By hooking one end of a cord to the rim 24 and the other end to a mounting in the boat cockpit, a secure mounting is achieved while providing a totally unobstructed view to the boat's occupants.

FIG. 6 shows container 10 being used as a storage container for both a coil 44 of stripped line 46 and for a fly fishing rod 48 and fly reel 50. By storing the rod, reel and line with the line stripped into container 10 during relocating, an angler need not rewind the line on the reel as a boat moves from one fishing spot to another. Furthermore, if the angler spots a fish upon stopping or even while moving, the line need not be stripped from the reel as it is already stripped and immediately ready to be cast. Upon casting, the line 46 slides over rim 24, through line guides 51 and into the water.

This feature is of importance in fishing tournaments where time is of the essence or if the angler simply desires more fishing time per day. Up to 10% or more fishing time is made available by using container 10 since the rod, reel and line need not be stowed in a conventional manner when relocating. Five stops at five different locations can add up to one addtional hour of fishing time if the rod, reel and line are stored according to the invention as shown in FIG. 6.

Figure 7:
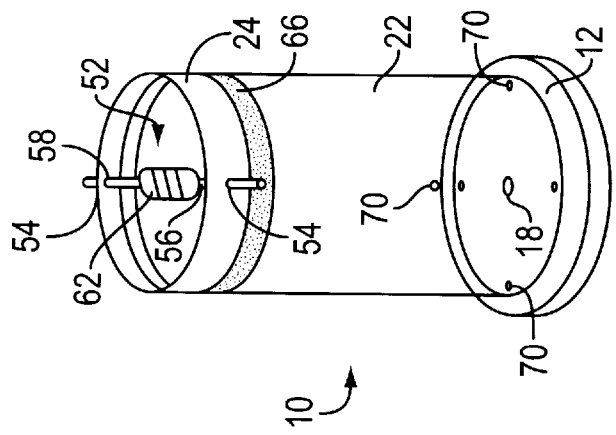
FIG.7 is a view similar to FIG. 1 showing a second embodiment of a fishing line container constructed in accordance with the invention.

A modified version of container 10 is shown in FIG. 7 wherein container 10 is provided with a carrying handle assembly 52 for carrying container 10 over land or from spot to spot on a boat. A pair of diametrically opposed mounting bores 54 is formed through rim 24 and the top of tube 22 for receiving the opposed ends of a rigid mounting rod 56 formed of aluminum or the like.

Figure 8:
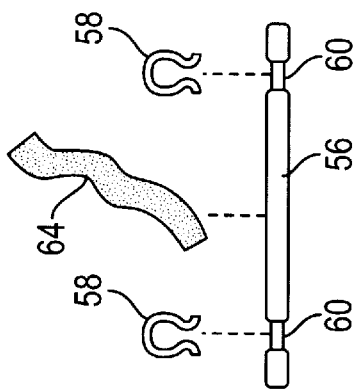
FIG. 8 is an enlarged and exploded view of the carrying handle of FIG. 7.

Rod 56 is detachably secured to container 10 via spring clips 58 which, as seen in FIGS. 7 and 8, snap into grooves 60 formed in rod 56. A soft handle grip 62 may be provided in the form of a detachable, spiral-wound strip of a hook and loop type fabric such as a Velcro strip 64. Rod 56 is typically removed from the container during casting.

Figure 11:
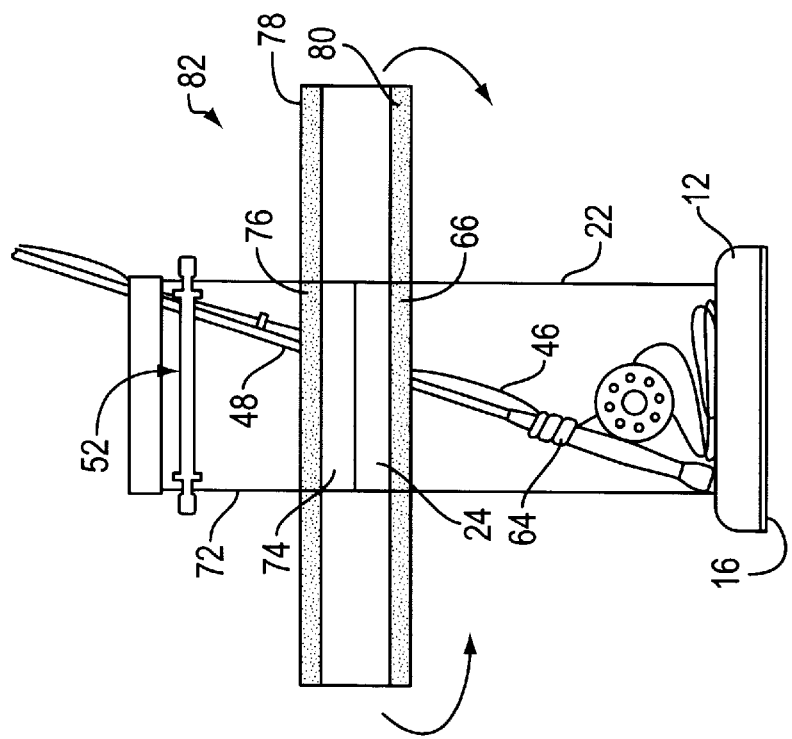
FIG. 11 is an elevation view of the tube of FIG. 9 mounted on the container of FIG. 7 with the strap of FIG. 10 partially secured to each.

As discussed further below in connection with FIG. 11, the Velcro strip 64 can be used to hold fly line securely to a fly rod while traveling, thereby preventing the line in the rod from being blown out. This is a quick, easy, knotless fastener designed for travel purposes. The Velcro strip may be quickly released from the rod to allow for a quick response to initiate casting, such as upon stopping a fishing boat with a fish in sight.

Figure 10:
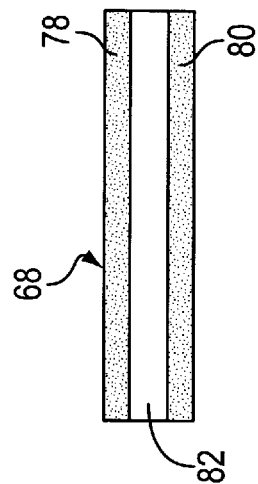
FIG. 10 is an elevation view of the inner or back face of a retainer strap for securing the extension tube of FIG. 9 to the container of FIG. 7.

Another Velcro strip 66 is shown in FIG. 7 mounted in permanent fashion, such as by adhesive bonding, on the exterior of tube 22 directly beneath rim 24. Strip 66 encircles tube 22 for engaging a belt 68 shown in FIG. 10. Additional drain holes 70 may be formed through base 12 as further shown in FIG. 7. It is also possible to form drain holes 70 through the bottom edge portion of tube 22 as shown.

Figure 9:
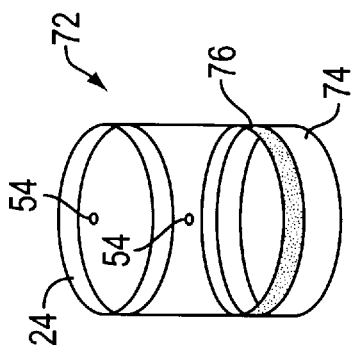
FIG. 9 is a perspective view of an extension tube for use with the container of FIG. 7.

An extension tube 72 is shown in FIG. 9. The construction and diameter of tube 72 is the same as that of tube 22 except that it is about half the length of tube 22, i.e., about 12 inches in length in its preferred form. Extension tube 72 includes a top rim 24 as well as a bottom rim 74, each of similar construction to that discussed above. Mounting bores 54 for receiving rod 56 may be formed either through rim 24 or through tube 72 as shown in FIG. 9.

A strip 76 of Velcro type fabric is fixed to the exterior of extension tube 72 such as by adhesive bonding. Strip 76 encircles the bottom of tube 72 directly above rim 74 for detachably engaging the Velcro type fabric strip 78 (FIG. 10) fixed to the upper inside edge of belt 68. A second Velcro type fabric strip 80 is similarly permanently fixed such as by adhesive bonding to the lower inside edge of belt 68.

The web or backing 82 of belt 68 is formed of a tough flexible pliable material such as cloth or preferably plastic. As seen in FIG. 11, belt 68 is adapted to detachably interconnect the tube extension 72 to the top of tube 22. All that is required to secure tube 72 to tube 22 is to stack the tubes one on the other as in FIG. 11, align strip 78 with strip 76, align strip 80 with strip 66 and tightly wrap belt 68 around the two concentric tubes.

The resulting container assembly 82 allows an angler to cast in hich winds with full effectiveness of the container. The additional 12 inch length of the two part tube and concomitant 12 additional inches of line weight provides a greater pull on the line to properly guide the line into the container without the line being blown away and out of the container.

Figure 12:
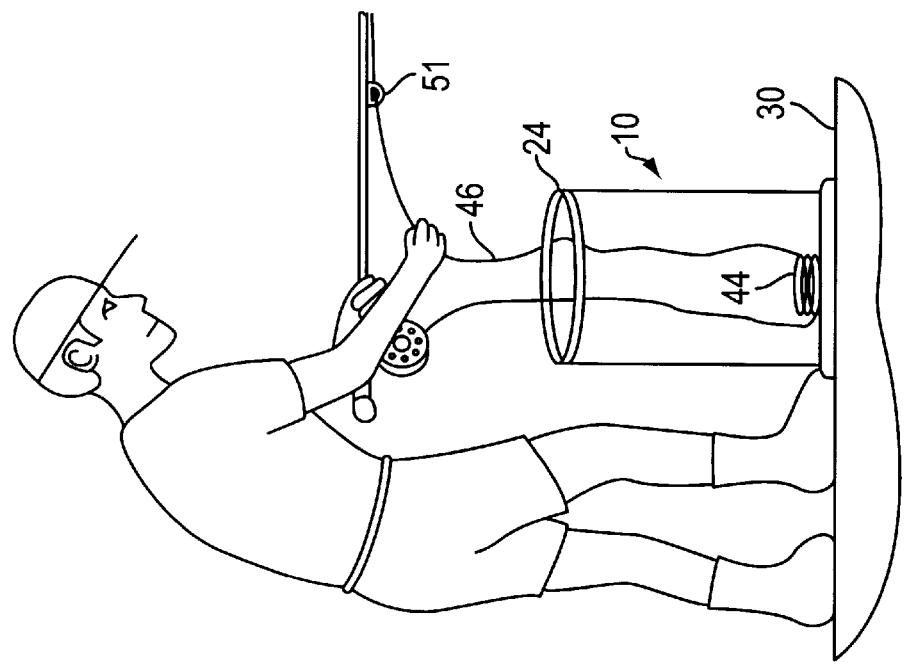
FIG. 12 is a schematic view of an angler using the container of FIG. 1 in accordance with the invention.

Another advantage of container assembly 82 is that it allows an angler to stand on a boat foredeck with the container assembly 82 resting in the lower portion of the boat cockpit. Alternatively, a taller person can use container assembly 82 as would an average height person use container 10 such as shown in FIG. 12.

An advantage of the present invention is that as line 46 is cast, it rubs over rim 24 as it exits the container and is automatically cleaned of any clinging dirt or debris. This cleaning may be further enhanced by applying a commercially available fly line cleaner over the surface of rim 24. As seen in FIG. 11, strips 64 can be removed from handle assembly 52 and wrapped around the handle of rod 48 so as to secure line 46 to the handle and further prevent tangling.

Figure 13:
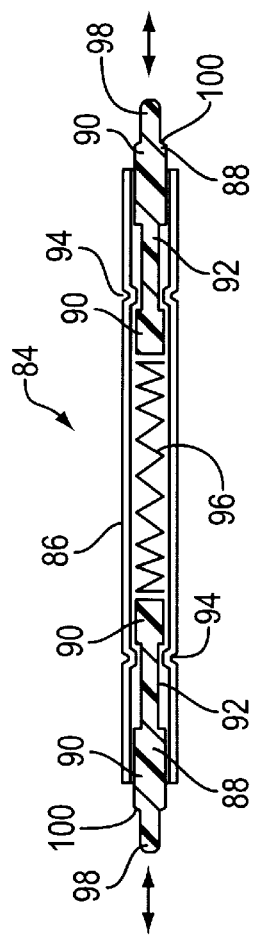
FIG. 13 is a longitudinal sectional view of an alternate handle embodiment for use with the container of FIGS. 7 and 11.
Figure 14:
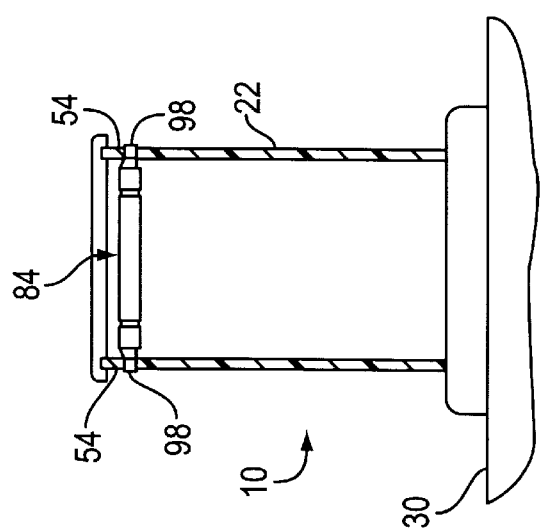
FIG. 14 is a view partly in section of the handle of FIG. 13 fitted to the container of FIG. 7.

Although the handle assembly 52 described above functions well, it does require the use of separately applied and removed spring clips 58. In order to eliminate the need for spring clips 58 and to reduce the possibility of damaging tube 22 during the installation, use and removal of handle assembly 52, the handle assembly 84 of FIG. 13 has been developed.

Handle assembly 84 includes a hollow cylindrical tube 86 formed of rigid material such as aluminum. A pair of plungers 88 is slidably mounted within opposite end portions of tube 86. Each plunger 88 includes a pair of cylindrical guide or plug sections 90 which slide closely within tube 86.

Each guide section 90 on each plunger 88 is interconnected with each other by a reduced diameter central shaft 92. Shaft 92 spans a circumferential 360° constriction 94 formed in tube 86 such as by rolling. Each constriction 94 prevents a respective plunger 84 from sliding out of tube 86.

A coil spring 96 is compressed within tube 86 between the pair of plungers 88. Spring 96 biases each plunger outwardly from tube 86 so that each inner guide section normally abuts each respective constriction 94.

Each plunger 88, which may be formed of a plastic material, includes a small diameter free end portion 98 which is sized to fit closely within each mounting bore 54 formed in container 10. End portions 98 are preferably rounded to facilitate their insertion into bores 54. A radial step 100 is formed on each plunger 88 to abut the inner surface of tube 22.

Handle assembly 84 is quickly and easily mounted to container 10 by inserting one end portion 98 of one plunger 88 into a mounting bore 54 and pushing against the inner wall of tube 22 with radial step 100 while holding tube 86. This causes plunger 88 to slide inwardly into tube 86 and to further compress spring 96. The other plunger 88 may then be inserted within the other mounting bore 54.

The handle assembly 84 is then released allowing coiled spring 96 to anchor each plunger within each mounting bore. Removal of the handle assembly is achieved equally quickly by reversing the mounting steps.

There has been disclosed heretofore the best embodiment of the invention presently contemplated. However, it is to be understood that various changes and modifications may be made thereto without departing from the spirit of the invention.

What is claimed is:

1. A fishing rod and line container comprising:
   a cylindrical tube formed from a first material having a first wall thickness and having a predetermined diameter greater than 10 inches, a predetermined length greater than 12 inches, a bottom circular portion and an open top circular portion comprising an annular top rim of C-shaped cross-section and defining a smooth inner edge;
   a weighted base provided with a high friction non-skid material and formed from a second material different from said first material and having a second wall thickness substantially greater than said first wall thickness, said base connected to said bottom portion of said tube and supporting said tube in an upright substantially vertical position and said base comprising a predetermined diameter greater than said predetermined diameter of said tube so as to define an annular flange projecting radially outwardly from and around said bottom portion of said tube, said base further comprising a central through hole for fastening said container to a support surface; and
   at least one drain passage extending through said base for draining water from within said container.

2. A container system for a fishing rod and reel and a fishing line, said container dimensioned for carrying by an angler and adapted for holding said line in natural self-forming coils when said line is partially stripped from said rod, comprising:
   a fishing rod and reel and fishing line removably attached to said rod and reel;
   a cylindrical tube formed of a first material having a first wall thickness and having a predetermined diameter greater than 10 inches to ensure that said fishing line forms said coils without tangles, a predetermined length greater than 12 inches to ensure that said fishing line falls naturally under its own weight into said container and forms said coils, and a bottom circular portion and an open top circular portion;

a weighted base formed of a second material different from said first material and having a second wall thickness substantially greater than said first wall thickness, said base connected to said bottom portion of said tube and supporting said tube in an upright substantially vertical position for supporting and storing said fishing rod; and at least one open drain passage located adjacent said base for draining water from within said container.

3. The container system of claim 2, wherein said base is formed from a high density polyethylene plastic material.

4. The container system of claim 2, wherein said base comprises a diameter greater than said diameter of said tube.

5. The container system of claim 2, wherein said tube comprises a plastic material.

6. The container system of claim 5, wherein said plastic material is a clear, see-through acrylic plastic material.

7. The container system of claim 2, wherein said tube comprises a top portion and an annular top rim mounted on said top portion of said tube and defining a smooth inner edge.

8. The container system of claim 7, wherein said top rim comprises a C-shaped cross section.

9. The container system of claim 2, wherein said predetermined diameter of said tube is approximately 12 inches.

10. The container system of claim 2, further comprising a handle provided on said container adjacent said top portion.

11. The container system of claim 10, wherein said handle is removable.

12. The container system of claim 10, wherein said handle is spring loaded.

13. The container system of claim 2, further comprising a cylindrical extension tube removably mounted on said cylindrical tube.

14. The container system of claim 13, further comprising a removable belt connecting said extension tube to said cylindrical tube.

15. The container system of claim 2, wherein said base comprises a central through hole for fastening said container to a support surface.

16. The container system of claim 2, further comprising a high friction non-skid material provided on said base.

17. A method of casting a fly line from a fly reel mounted on a pole having a plurality of line guides secured thereon, wherein said method comprises:

stripping said fly line from said reel directly into a cylindrical container having a smooth rim;

casting said fly line into a body of water such that said fly line slides over said smooth rim and into one of said line guides; and storing said reel and said pole in said container after stripping said fly line and before casting said fly line, with said fly line arranged in a coil during said storing.

18. The method of claim 1, wherein said container comprises a cylindrical tube having a predetermined diameter, a predetermined length, a bottom circular portion, a top circular portion and a base connected to said bottom portion of said tube and supporting said tube in an upright substantially vertical position.

19. The method of claim 18, wherein said base comprises a high density polyethylene plastic material providing said container with a center of gravity adjacent said base.

20. The method of claim 18, wherein said base comprises a predetermined diameter greater than said predetermined diameter of said tube so as to define an annular flange projecting radially outwardly from and around said bottom portion of said tube.

21. The method of claim 18, wherein said tube comprises a plastic material.

22. The method of claim 21, wherein said plastic material is a clear, see-through acrylic plastic material.

23. The method of claim 18, wherein said container further comprises an annular top rim mounted on said top portion of said tube and defining a smooth inner edge.

24. The method of claim 23, wherein said top rim comprises a C-shaped cross section.

25. The method of claim 18, wherein said predetermined diameter is greater an 10 inches.

26. The method of claim 18, wherein said predetermined diameter is approximately 12 inches.

27. The method of claim 18, wherein said container further comprises a handle provided on said container adjacent said top portion.

28. The method of claim 27, wherein said handle is removable.

29. The method of claim 27, wherein said handle is spring loaded.

30. The method of claim 18, wherein said base comprises at least one water drain passage extending through said base.

31. The method of claim 18, wherein said container further comprises a cylindrical extension tube removably mounted on said cylindrical tube.

32. The method of claim 31, further comprising a removable belt connecting said extension tube to said cylindrical tube.

33. The method of claim 18, wherein said base comprises a central through hole for fastening said container to a support surface.

34. The method of claim 18, wherein said container further comprises a high friction non-skid material provided on said base.

* * * * *